US010900348B2

(12) United States Patent
Schollenberger et al.

(10) Patent No.: US 10,900,348 B2
(45) Date of Patent: Jan. 26, 2021

(54) CORIOLIS DIRECT WELLHEAD MEASUREMENT DEVICES AND METHODS

(71) Applicant: Micro Motion, Inc., Boulder, CO (US)

(72) Inventors: Frederick Scott Schollenberger, Boulder, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 800 days.

(21) Appl. No.: 15/030,426

(22) PCT Filed: Nov. 14, 2013

(86) PCT No.: PCT/US2013/070179
§ 371 (c)(1),
(2) Date: Apr. 19, 2016

(87) PCT Pub. No.: WO2015/073013
PCT Pub. Date: May 21, 2015

(65) Prior Publication Data
US 2016/0245074 A1 Aug. 25, 2016

(51) Int. Cl.
*E21B 47/10* (2012.01)
*G01F 1/74* (2006.01)
(Continued)

(52) U.S. Cl.
CPC .......... *E21B 47/10* (2013.01); *G01F 1/74* (2013.01); *G01F 1/8436* (2013.01); *G01F 1/8477* (2013.01); *G01F 15/08* (2013.01)

(58) Field of Classification Search
CPC .......... E21B 47/10; G01F 1/74; G01F 1/8436; G01F 1/8477; G01F 15/08
(Continued)

(56) References Cited

U.S. PATENT DOCUMENTS 5,594,180 A * 1/1997 Carpenter .................. G01F 1/74
303/15
6,318,156 B1 * 11/2001 Dutton ..................... E21B 43/36
73/61.44
(Continued)

FOREIGN PATENT DOCUMENTS

EP 2275787 A2 1/2011
WO 9605484 A1 2/1996
(Continued)

OTHER PUBLICATIONS

Mmi-20011276 "Micro Motion Series 3000 MVD Transmitters Net Oil Computer Supplement Instruction Manual" Mar. 1, 2008 (Mar. 1, 2008), pp. 1-72, XP055135765, Retrieved from the Internet: URL: http://www2.emersonprocess.com/siteadm incenter/PM Micro Motion Documents/MMI-20011376 A.pdf [retrieved on Aug. 21, 2014] p. 11-p. 15; figures 2-5, 2-6, 4-1; tables 5-7.

*Primary Examiner* — Sheikh Maruf
(74) *Attorney, Agent, or Firm* — The Ollila Law Group LLC (57) ABSTRACT

Coriolis direct wellhead measurement devices and methods are provided. The devices and methods allow for continuous monitoring, more frequent data, and greater accuracy in quantitative and qualitative measurements of well performance. In an embodiment: an entrained gas severity of a wellhead is determined based on a determined drive gain threshold, at least one variable is output based on the determined entrained gas severity, and a respective confidence indicator correlating to the at least one variable is output. One mode of operation includes continually averaging the at least one variable over a predetermined time interval and outputting a respective single averaged data value. Another mode of operation includes outputting at least one instantaneous variable at predetermined and uni-
(Continued)

form time intervals. Diagnostic information and user alerts are also output to provide reliable decision making information to an operator.

27 Claims, 5 Drawing Sheets (51) Int. Cl.
G01F 1/84 (2006.01)
G01F 15/08 (2006.01)

(58) Field of Classification Search
USPC .......................................................... 702/12
See application file for complete search history.

(56) References Cited

U.S. PATENT DOCUMENTS

| | | | | |
|---|---|---|---|---|
| 6,327,914 B1* | 12/2001 | Dutton | ................. | G01F 1/8413 73/32 A |
| 6,347,293 B1* | 2/2002 | Cunningham | ........ | G01F 1/8413 702/100 |
| 6,772,036 B2* | 8/2004 | Eryurek | ............... | D21G 9/0027 162/238 |
| 6,810,719 B2* | 11/2004 | Dutton | .................... | E21B 43/36 73/61.44 |
| 6,981,424 B2* | 1/2006 | Henry | ....................... | G01F 1/74 73/861.356 |
| 7,617,055 B2* | 11/2009 | Henry | ....................... | G01F 1/74 702/100 |
| 8,831,896 B2* | 9/2014 | Weinstein | ................. | G01F 1/74 702/50 |
| 2003/0136185 A1* | 7/2003 | Dutton | .................... | E21B 43/36 73/61.44 |
| 2004/0031328 A1* | 2/2004 | Henry | ................... | G01F 1/8404 73/861.18 |
| 2005/0081643 A1* | 4/2005 | Mattar | ..................... | G01F 1/74 73/861.355 |
| 2005/0193832 A1* | 9/2005 | Tombs | .................. | G01F 1/8436 73/861 |
| 2006/0096388 A1* | 5/2006 | Gysling | ..................... | G01F 1/74 73/861.03 |
| 2006/0161366 A1* | 7/2006 | Mattar | ..................... | G01F 1/74 702/100 |
| 2006/0247869 A1* | 11/2006 | Lucero | ..................... | G01F 1/86 702/50 |
| 2006/0277000 A1* | 12/2006 | Wehrs | ..................... | G01F 15/00 702/183 |
| 2007/0131024 A1* | 6/2007 | Drahm | .................. | G01F 1/8413 73/54.27 |
| 2007/0198221 A1* | 8/2007 | James | ..................... | G01F 15/063 702/187 |
| 2008/0028822 A1* | 2/2008 | Mattar | ..................... | G01F 1/32 73/1.16 |
| 2008/0053240 A1* | 3/2008 | Henry | ....................... | G01F 1/74 73/861.04 |
| 2008/0184813 A1* | 8/2008 | Patten | .................. | G01F 1/8413 73/861.355 |
| 2008/0190195 A1* | 8/2008 | Duffill | .................... | G01N 9/002 73/32 A |
| 2008/0257067 A1* | 10/2008 | Henry | ....................... | G01F 1/74 73/861.356 |
| 2009/0321664 A1* | 12/2009 | Stueven | ..................... | C08J 3/12 250/492.1 |
| 2010/0170322 A1* | 7/2010 | Van Cleve | ................. | G01F 1/74 73/1.16 |
| 2010/0198531 A1* | 8/2010 | Bell | .......................... | G01F 1/74 702/45 |
| 2010/0307598 A1* | 12/2010 | Cao | .................... | B01D 19/0063 137/2 |
| 2011/0005337 A1* | 1/2011 | Mattar | ..................... | G01F 1/32 73/861.354 |
| 2012/0096923 A1* | 4/2012 | Weinstein | ................. | G01F 1/74 73/19.03 |
| 2012/0118077 A1* | 5/2012 | Henry | .................... | G01F 15/024 73/861.354 |
| 2012/0245895 A1* | 9/2012 | Rud | ................... | G05B 23/0221 702/183 |
| 2014/0076408 A1* | 3/2014 | Zimmer | ................. | G01F 1/8436 137/12 |
| 2014/0224006 A1* | 8/2014 | Scott | ....................... | E21B 49/00 73/152.18 |
| 2016/0008742 A1* | 1/2016 | Adler | ................. | B01D 19/0063 96/157 |
| 2016/0091358 A1* | 3/2016 | Fraser | ................. | G01F 25/0007 73/1.16 |
| 2016/0333686 A1* | 11/2016 | Scott | ....................... | E21B 49/08 |

FOREIGN PATENT DOCUMENTS

| | | |
|---|---|---|
| WO | 0019175 A1 | 4/2000 |
| WO | 2011008307 A1 | 1/2011 |

* cited by examiner

CORIOLIS DIRECT WELLHEAD MEASUREMENT DEVICES AND METHODS

BACKGROUND OF THE INVENTION

Field of the Invention

The present invention relates to Coriolis direct wellhead measurement devices and methods, and more particularly, to Coriolis direct wellhead measurement devices and methods that provide continuous monitoring and greater accuracy in quantitative and qualitative measurements of well performance.

Statement of the Problem

Direct wellhead measurement refers to the ability to continuously measure production in an individual wellhead or a series of wells. This type of particular measurement is desired as the data provided is relevant to day-to-day operational decisions including the determination of which wells to decommission in a field and which techniques to implement to produce the most oil or gas from a particular well.

From a measurement perspective, wells in different geographic locations vary widely. In the Middle East, many wells flow liquids (oil and water) along with small amounts of gas in a relatively smooth and continuous manner, with steady flow rates that decline gradually over time as the well is depleted. In the United States as well as other countries, it is often necessary to pump fluids such as water or carbon dioxide down-hole to produce oil and gas, or to directly pump the oil and gas to the surface. This tends to result in highly variable flow rates, and gas fractions that cycle from 0 to 100%. These type of wells often involve a measurement environment similar to an empty-full-empty batch, where the meter is blown out with gas before and after the liquid portion of a batch. Another type of well involves primarily natural gas flow, including small quantities of oil, water, or condensate, resulting in a "wet gas" measurement environment.

In the absence of a reliable and cost-effective direct wellhead measurement device, the most common workaround is to use a "test separator" and intermittently (i.e. once per month) test each well, and then presume that no changes have occurred prior to the next test.

An alternative solution is to use a permanent separator or a multiphase flow meter at each wellhead. However, both of these options are extremely expensive, and often involve significant maintenance and/or customization on a per-well basis. Many operators have hundreds or thousands of small wells in a given location, and it is often cost-prohibitive and time-prohibitive to consider these options at each individual site.

Accordingly, there is a true need for a direct wellhead measurement device that is cost-effective, low maintenance, and provides reliable, accurate, and timely measurement data. There is a need to provide more frequent data on well performance, including data pertaining to water cut and flow rate. By providing this information, better decisions can be made regarding various everyday reservoir management issues, such as whether a well should be shut down or a change in production technique is necessary regarding a particular well.

SUMMARY OF THE INVENTION

The present invention overcomes the problems outlined above and advances the art by providing a Coriolis direct wellhead measurement device and method that allows for greater intelligence in well testing, is sufficiently reliable and provides more frequent data, and yet, is more cost-effective than devices and methods that are currently known in the art.

In particular, the present invention provides more frequent measurement of well performance as compared to known test separator methods. Moreover, the present invention provides solutions to several everyday operational questions including: which wells are producing only water and should be shut down; when does a historically liquid-only well start producing gas; has the well's flow rate changed significantly since yesterday; and is this well multiphase right now?

ASPECTS OF THE INVENTION

In one aspect of the present invention, a method for direct wellhead measurement of at least one well, the method comprising: determining an entrained gas severity of the at least one well, where the entrained gas severity is based on the amount of entrained gas exceeding a determined drive gain threshold; outputting at least one variable based on the determined entrained gas severity; and outputting a respective confidence indicator correlating to the at least one variable.

Preferably, the at least one variable includes at least one of: flow variables, diagnostic information, and user alerts.

Preferably, flow variables include at least one of: mass flow, volume flow, density, water cut, and net oil.

Preferably, the diagnostic information include at least one of: temperature; detection of multiphase conditions; time durations within measurement time intervals where the entrained gas is above the determined drive gain threshold; and information of multiphase conditions, the information of multiphase conditions including at least one of: gas void fraction, continuous entrainment, and slugging gas entrainment.

Preferably, the outputting the at least one variable includes continually averaging the at least one variable over a predetermined time interval and outputting a respective single averaged data value of the at least one variable.

Preferably, the predetermined time interval is determined by one of a user and flow conditions, the flow conditions including one of intermittent slugging and continuous entrainment.

Preferably, the predetermined time interval is one of uniform and non-uniform in duration.

Preferably, the at least one continually averaged variable includes at least one of: flow variables, diagnostic information, and user alerts if the entrained gas severity is below the determined drive gain threshold.

Preferably, the at least one continually averaged variable includes at least one of: diagnostic information and user alerts if the entrained gas severity is above the determined drive gain threshold.

Preferably, the outputting the at least one variable includes outputting at least one instantaneous variable at predetermined and uniform time intervals.

Preferably, the outputting the at least one instantaneous variable includes at least one of: flow variables, diagnostic information, and user alerts if the entrained gas severity is below the determined drive gain threshold.

Preferably, the outputting the at least one instantaneous variable include at least one of: diagnostic information and user alerts if the entrained gas severity is above the determined drive gain threshold.

Preferably, the outputting the at least one instantaneous variable further includes holding a last data value of flow variables and outputting the held last data value correlating to the predetermined and uniform time intervals.

Preferably, the respective confidence indicator is based on a time duration within a measurement time interval where gas entrainment is detected.

Preferably, the respective confidence indicator is based on a computed comparison of a portion of one of mass or volume flow occurring with gas entrainment and one of a total mass and total volume flow during a measurement time interval.

Preferably, the respective confidence indicator is based on a computation of flow conditions, the flow conditions including one of intermittent slugging and continuous entrainment.

Preferably, the respective confidence indicator is based on at least one of: a percentage of mass during the predetermined time interval where the entrained gas severity is above the determined drive gain threshold, a percentage of time where the entrained gas severity is above the determined drive gain threshold, and total volume flow.

Preferably, the respective confidence indicator is based on at least one of: a cumulative moving average of a percentage of time the entrained gas severity is above the determined drive gain threshold, a percentage of mass flow where the entrained gas severity is above the determined drive gain threshold, a quantity of time durations where entrained gas severity is below the determined drive gain threshold, and total volume flow.

Preferably, the at least one well includes electric submersible pumps.

Preferably, determining the drive gain threshold includes determining if flow conditions include at least one of: gas void fraction, continuous entrainment, and slugging gas entrainment.

Preferably, determining the drive gain threshold includes: storing at least one factory baseline drive gain values set during meter calibration; computing at least one time period where a measured drive gain is low and steady; and setting the drive gain threshold based on the measured drive gain correlating to the at least one time intervals.

Preferably, correcting the drive gain threshold based on a measured water cut and increases in viscosity.

In one aspect of the present invention, a method for direct wellhead measurement of at least one well, the method comprising: detecting an entrained gas severity of the at least one well, where the entrained gas severity is based on the amount of entrained gas exceeding a determined drive gain threshold; and outputting at least one variable based on the determined entrained gas severity, wherein the outputting the at least one variable includes continually averaging the at least one variable over a predetermined time interval and outputting a respective single averaged data value of the at least one variable.

In one aspect of the present invention, a method for direct wellhead measurement of at least one well, the method comprising: determining an entrained gas severity of the at least one well, where the entrained gas severity is based on the amount of entrained gas exceeding a determined drive gain threshold; and outputting at least one variable based on the determined entrained gas severity, wherein the outputting the at least one variable includes outputting at least one instantaneous variable at predetermined and uniform time intervals.

In one aspect of the present invention, a method for direct wellhead measurement of at least one well, the method comprising: determining an entrained gas severity of the at least one well, wherein the entrained gas severity is based on the amount of entrained gas exceeding a determined drive gain threshold, and wherein the determining the drive gain threshold includes: storing at least one factory baseline drive gain values set during meter calibration; computing at least one time period where a measured drive gain is low and steady; and setting the drive gain threshold based on the measured drive gain correlating to the at least one time intervals; and outputting at least one variable based on the determined entrained gas severity.

In one aspect, meter electronics for a direct wellhead measurement device, the meter electronics comprising an interface configured to communicate with a flowmeter assembly of the direct wellhead measurement device, and receive a vibrational response, and a processing system coupled to the interface and configured to: determine an entrained gas severity of an at least one well, where the entrained gas severity is based on the amount of entrained gas exceeding a determined drive gain threshold; output the least one variable based on the determined entrained gas severity; and output a respective confidence indicator correlating to the at least one variable.

In one aspect, a Coriolis direct wellhead measurement device comprising: a flowmeter assembly to generate a vibrational response; and meter electronics connected to the flowmeter assembly configured to receive and process the vibrational response to generate respective values of an at least one variable; the meter electronics further configured to: determine an entrained gas severity of an at least one well, where the entrained gas severity is based on the amount of entrained gas exceeding a determined drive gain threshold; output the least one variable based on the determined entrained gas severity; and output a respective confidence indicator correlating to the at least one variable.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
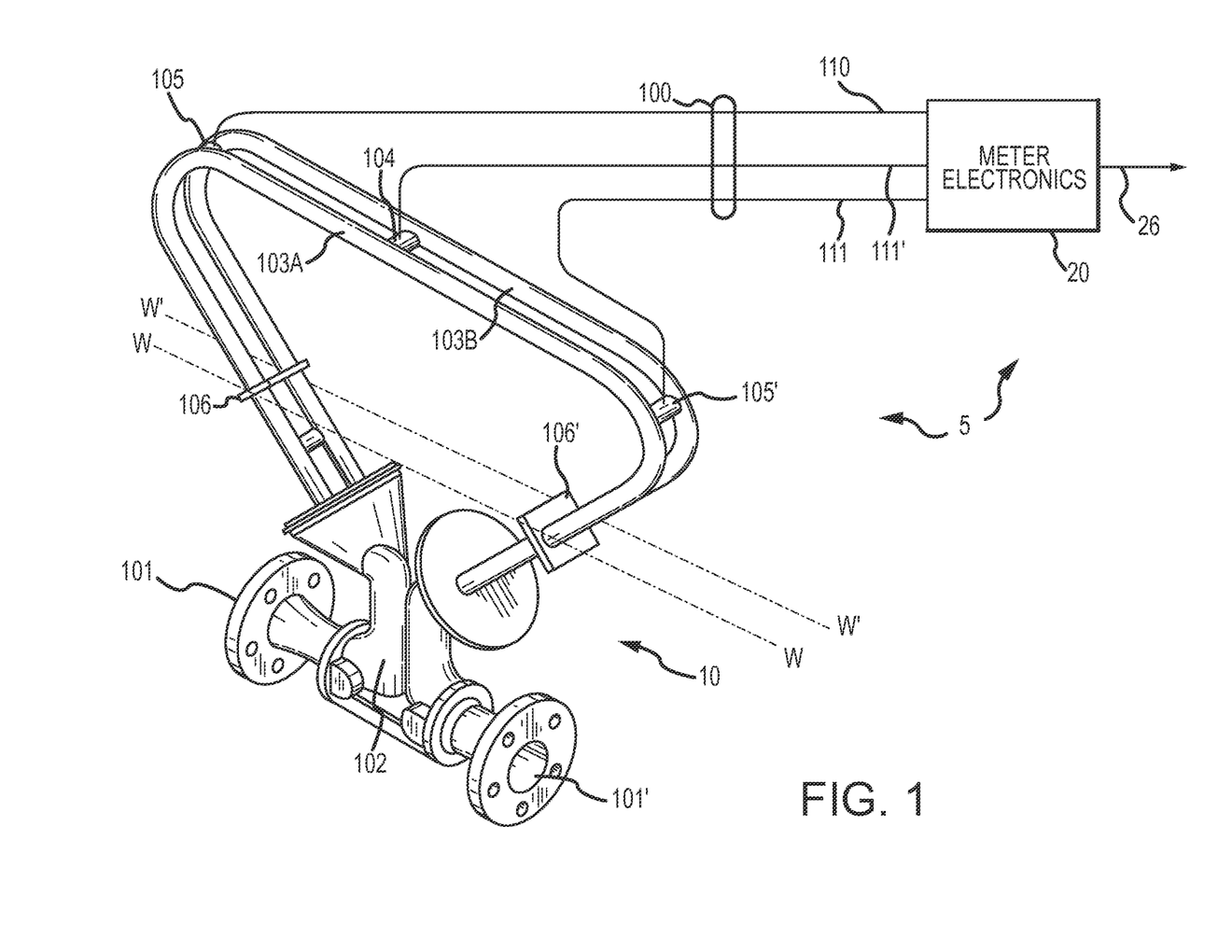
FIG. 1 shows a direct wellhead measurement device comprising a meter assembly and meter electronics.

FIG. 1 shows a direct wellhead measurement device 5 according to the invention. The direct wellhead measurement device 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. The wellhead measurement device 5 can comprise a Coriolis mass flow meter. It should be apparent to those skilled in the art that the wellhead measurement can comprise any manner of wellhead measurement device, regardless of the number of drivers, pick-off sensors, flow conduits, or the operating mode of vibration.

The direct wellhead measurement device assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102' in order to prevent pipeline forces from being transmitted to flow conduits 103A and 103B. When the direct wellhead measurement device assembly 10 is inserted into a pipeline (not shown) which carries the flow fluid being measured, the flow fluid enters the flowmeter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow fluid can comprise a liquid. The flow fluid can comprise a gas. The flow fluid can comprise a multi-phase fluid, such as a liquid including entrained gases and/or entrained solids. The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flowmeter 5. The driver 104 may comprise one of many well-known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111 and 111', respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 1 is provided merely as an example of the operation of a direct wellhead measurement device and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105 and 105'. The vibrational signals comprise a vibrational response of the flowtubes 103A and 103B. The meter electronics 20 processes the vibrational response and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the wellhead measurement device can comprise substantially straight flowtubes. Additional flowmeter shapes and/or configurations can be used and are within the scope of the description and claims.

Figure 2:
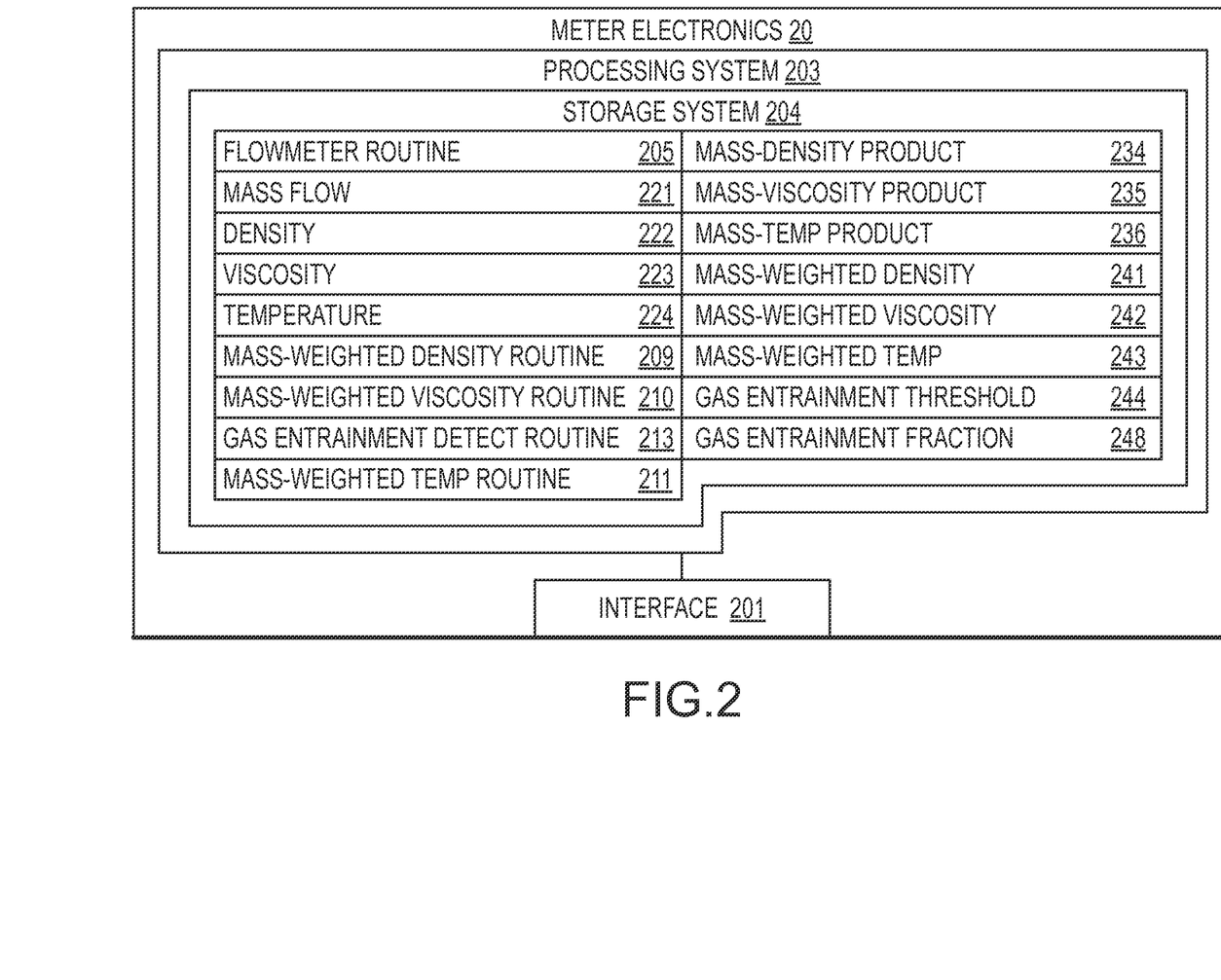
FIG. 2 shows a block diagram of the meter electronics according to an embodiment of the invention.

FIG. 2 is a block diagram of the meter electronics 20 of direct wellhead measurement device 5 according to the invention. In operation, direct wellhead measurement device 5 provides various measurement values that may be outputted including a measured or averaged value of water cut, oil flow rate, water flow rate, and total flow rate, including, for example, both volume and mass flow.

The direct wellhead measurement device 5 generates a vibrational response. The vibrational response is received and processed by the meter electronics 20 to generate one or more fluid measurement values. The values can be monitored, recorded, totaled, and output The meter electronics 20 includes an interface 201, a processing system 203 in communication with the interface 201, and a storage system 204 in communication with the processing system 203. Although these components are shown as distinct blocks, it should be understood that the meter electronics 20 can be comprised of various combinations of integrated and/or discrete components.

The interface 201 is configured to communicate with the flowmeter assembly 10 of the measurement device 5. The interface 201 may be configured to couple to the leads 100 (see FIG. 1) and exchange signals with the driver 104 and the pickoff sensors 105 and 105'. The interface 201 may be further configured to communicate over the communication path 26, such as to external devices.

The processing system 203 can comprise any manner of processing system. The processing system 203 is configured to retrieve and execute stored routines 205 in order to operate the direct wellhead measurement device 5. The storage system 204 can store routines including a wellhead measurement routine 205, a mass-weighted density routine 209, a mass-weighted viscosity routine 210, a mass-weighted temperature routine 211, and a gas entrainment detect routine 213. Other measurement/processing routines are contemplated and are within the scope of the description and claims. The storage system 204 can store measurements, received values, working values, and other information. In some embodiments, the storage system stores a mass flow (m) 221, a density (ρ) 222, a viscosity (μ) 223, a temperature (T) 224, a mass-density product (m ρ) 234, a mass-viscosity product (m μ) 235, a mass-temperature product (m T) 236, a mass-weighted density (ρmass-weighted) 241, a mass-weighted viscosity (μmass-weighted) 242, a mass-weighted temperature (Tmass_weighted) 243, a gas entrainment threshold 244, and a gas entrainment fraction 248. The measurement routine 205 can produce and store fluid quantifications and flow measurements. These values can comprise substantially instantaneous measurement values or can comprise totaled or accumulated values. For example, the measurement routine 205 can generate mass flow measurements and store them in the mass flow storage 221. The measurement routine 205 can generate density measurements and store them in the density storage 222. The mass flow and density values are determined from the vibrational response, as previously discussed and as known in the art. The mass flow can comprise a substantially instantaneous mass flow rate value, can comprise a mass flow rate sample, can comprise an averaged mass flow rate over a time interval, or can comprise an accumulated mass flow rate over a time interval. The time interval may be chosen to correspond to a block of time during which certain fluid conditions are detected, for example a liquid-only fluid state, or alternatively a fluid state including liquids and entrained gas. In addition, other mass flow quantifications are contemplated and are within the scope of the description and claims.

Figure 3:
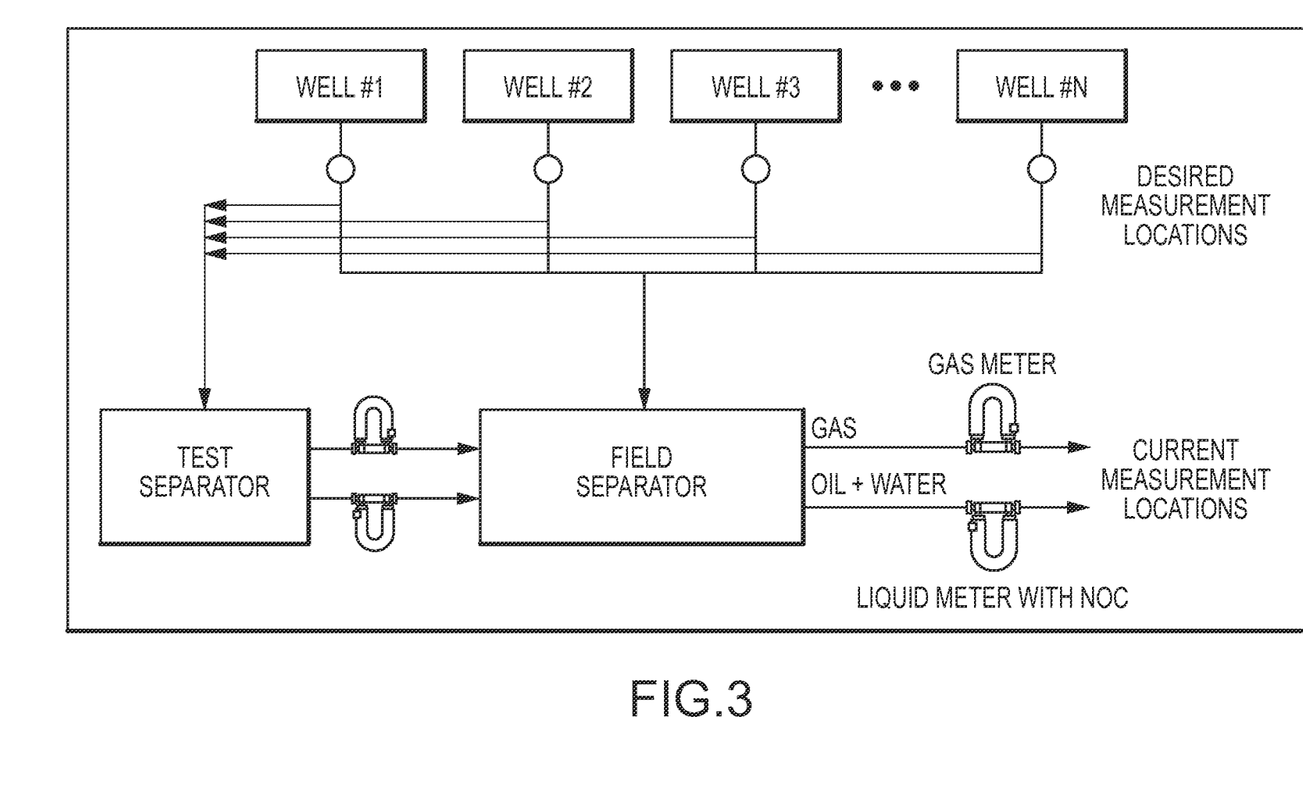
FIG. 3 illustrates an implementation of the present invention according to an embodiment of the invention.

In FIG. 3, several individual wells are shown in a field, all outputting some quantity of oil, water, and natural gas. All of these wells flow into a field separator, where the gas and liquid streams are measured separately, then recombined and sent downstream to a production separator. A smaller test separator is also typically used to test single wells on an intermittent basis, for example, once per month. With this system, performance of an individual well is only known once per month, and conditions may change significantly in between. However, according to the present invention of direct wellhead measurement including a direct wellhead measurement device 5, at each of the red circles, constant monitoring of each well is possible and better day-to-day operational decisions may be made.

According to example embodiments, Coriolis wellhead measurement devices have the ability to detect even small amounts of entrained gas in a liquid stream via a measurement of tube drive power, known as the diagnostic drive gain. Drive gain is a measure of the amount of drive power required to keep the flow tubes of a Coriolis meter vibrating to constant amplitude. For single phase measurement of gas or liquid, the drive gain is low and steady, as relatively little power is required to vibrate a structure at its natural frequency. However, when even small amounts of gas is present in a liquid, or small amounts of liquid are present in a gas, the drive power required for vibration increases dramatically. This makes drive gain a very reliable detection diagnostic for entrained gas.

However, gas is not the only condition that affects drive gain. According to the present embodiments, for example, each direct wellhead measurement device has a different baseline drive gain determined when the fluid in the meter is single phase. Different meter baselines are due to size of flow tubes and the damping of various components. Also, within a given measurement device, each individual unit, or serial number, has a slightly different baseline drive gain. Additionally, fluid viscosity may also affect drive gain. Higher viscosity liquids cause slightly higher drive gain. Though neither the sensor model nor fluid viscosity influence drive gain to the degree that entrained gas impacts drive gain, both of these effects should ideally be compensated for, in order to allow for the most sensitive detection of entrained gas.

The presence of gas is said to exist when drive gain exceeds a threshold. In one embodiment, the drive gain threshold may be determined by the use of factory baseline drive gain values established during meter calibration or during testing at the factory. This eliminates the variation of a given measurement device or serial number on the baseline drive gain. In another embodiment, the drive gain threshold may be determined by an algorithm to establish various threshold levels during operation. For example, an approximately 0% gas volume fraction drive gain may be established when flow and density parameters are steady, as, of the above mentioned influences on drive gain, only multiphase conditions typically cause increased noise. In implementation, this may involve making corrections for known viscosity and/or measured water cut, as both can have a small impact on drive gain. Furthermore, after compensating for the above influences using a baseline drive gain and a drive gain threshold algorithm, the drive gain threshold may be lowered to more accurately detect the presence of very low gas volume fractions. This can lead to greater accuracy in the reporting of liquid-only measurement values. In yet another embodiment, a drive gain threshold may be determined by a baseline value established during installation of the present measurement device or as part of a startup process at each well.

At times when a drive gain is low and stable, gas is not present in the pipeline and all measurements may be assumed to be accurate within normal flowmeter specifications. Many wells involve only intermittent entrained gas (referred to as "slugging" among other names), and over the course of an hour or day, it is likely a time interval exists where no gas is present. During this time, the drive gain is low and stable, and flow rate, density, and any other measurement made by the meter may be trusted and output to the user or recorded for statistical analysis. This would allow an accurate determination of water cut, oil flow rate, and water flow rate at that period of low drive gain, as the requirements for the following equations are satisfied at that time:

$$\varphi_o + \varphi_w = 1 \qquad 1.$$

$$\rho_{measured} = \varphi_o \rho_o + \varphi_w \rho_w \qquad 2.$$

Where $\varphi_w$ and $\varphi_o$ are the respective volume fractions of water and oil in the fluid and $\rho_w$ and $\rho_o$ are the respective known densities of water and oil. The first equation states that the volume fractions of the phases sum to 1, and the second equation states that the measured density is a weighted sum of the oil and water components. The flowmeter electronics may use the above equations to determine phase fractions in the absence of gas. If gas is entrained, three phase fractions actually exist, and therefore the above equations are not valid. Unlike phase fractions, water cut and individual oil/water flow rates, which may be inaccurate in the presence of gas, the total mixture mass or volume flow rates can be output at any time with more reasonable accuracy, as they do not rely on equations 1 and 2. In embodiments, the measurement outputs may be in the form of instantaneous values or in the form of an averaged value over a particular time interval.

By way of example, and not limitation, the direct wellhead measurement device may have two output modes. The measurement device may operate in these modes either individually or simultaneously. In example embodiments, the output variables in each of the modes may be similar; and, in other embodiments may include differences in how the variables are processed and output. For example, the variables output may include, but are not limited to: flow variables, diagnostic information, and user alerts. In embodiments, flow variables (also referred to as quantitative variables) may include, but are not limited to: mass flow, volume flow, density, water cut, and net oil. In embodiments, diagnostic information, also referred to as qualitative variables) may include, but are not limited to: temperature, a confidence level in the flow variables' accuracy, detection of multiphase conditions, the time durations of snapshot time intervals (as defined in the following paragraphs) during which gas may be detected (weighted by a mass, volume, or time component of the flow), and information regarding multiphase conditions; for example, gas void fraction, and continuous or slugging gas entrainment.

Figure 4:
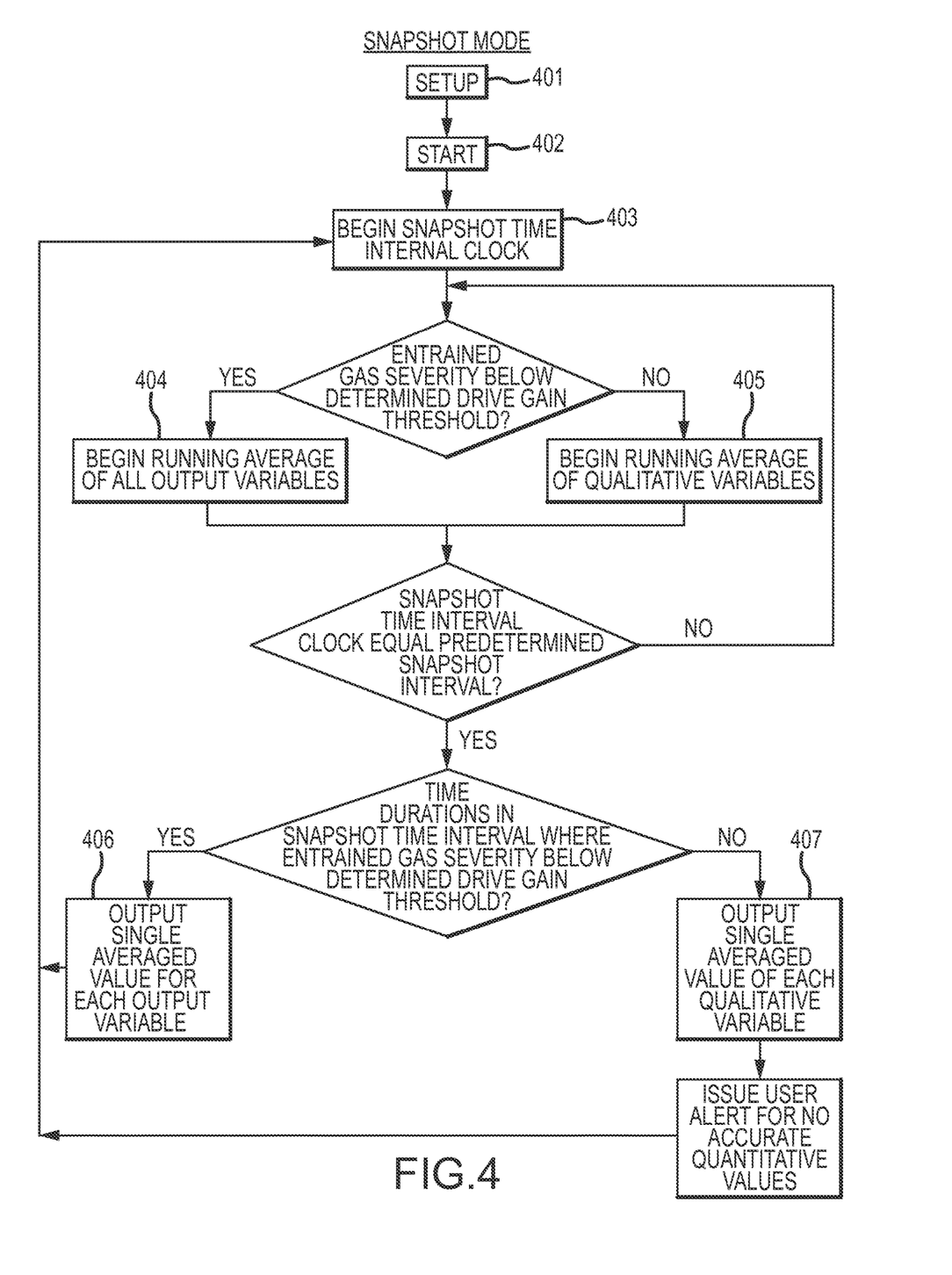
FIG. 4 is a flowchart of a method of the wellhead measurement device according to an embodiment of the invention.

FIG. 4 shows a flowchart of a method of the wellhead measurement device according to a first output mode of example embodiments. For convenience, the first output mode will be referred to as "snapshot" mode throughout the description. According to FIG. 4, a wellhead measurement device is incorporated on an individual wellhead of a field of wellheads. As part of the setup, in 401, the measurement device includes customizable settings and configurations for the benefit of the operator of the device. For example, configurations and settings may be determined by a well site survey or well test, the geographic location, the well type (e.g. free-flowing or assisted lift), the flow rate, the density, and the behavior of the entrained gas in the measured fluid. Accordingly, an operator may determine proper setup of the measurement device, including what outputs are appropriate for the particular well site. For example, according to snapshot mode, proper set up may include, but are not limited to: a predetermined snapshot time interval (as discussed below) for well performance measurement, a determined drive gain threshold (as previously explained), threshold levels for the detection of the nature and severity of multiphase conditions, and the particular output variables required by the operator.

In 402, upon commencement of various configurations and settings, the measurement device is ready for operation. As an embodiment, in snapshot mode, a snapshot time interval clock is initiated (403). In this mode, for example, the snapshot time interval is determined by either the operator, or is automatically determined by the measurement device based on flow conditions, and may be either uniform or non-uniform in duration. Over the span of a snapshot time interval, each output variable is averaged. At the end of a snapshot time interval, an averaged value of each variable is output. However, to improve the accuracy of the outputs of flow variables, the averaging may occur only when drive gain is below the drive gain threshold (404). During durations of the snapshot time interval where drive gain is above the drive gain threshold, in 405, continuous averaging of flow variables is stopped; nevertheless, the measurement device may still monitor the flow in order to determine the above mentioned diagnostic information and user alerts. In this instance, the measurement device operates to continually average values of other variables, or qualitative variables, which do not require a high accuracy of measurement or are not materially distorted by the presence of entrained gas. For example, these variables may include, but are not limited to: temperature, gas void fraction, or confidence indicators related to the current snapshot time interval (405). When the snapshot time interval is complete (406); for example, when the initiated snapshot time interval equals the predetermined snapshot time interval, a single averaged data value for each variable, respectively, is outputted. In 407, if severe multiphase conditions exist throughout the entire snapshot time interval, in embodiments, some variables, for example flow variables, may not be reported or may be reported along with a low confidence level indicator. In this instance, averaged values of qualitative variables may be outputted. Moreover, a user alert may be generated as a warning that no accurate measurement values for flow variables were obtained during the respective snapshot time interval.

In aspects of the snapshot mode, the factors in determining the confidence level indicator include, but are not limited to the: percentage of mass that traveled through the measurement device during a snapshot interval where the entrained gas severity exceeded the drive gain threshold and the percentage of time during a snapshot interval where the entrained gas severity exceeded the drive gain threshold. In aspects of snapshot mode, the confidence measurement may be determined over the course of a snapshot time interval. For example, at the end of the snapshot time interval, a single confidence value is output for a particular snapshot time interval. Moreover, in instances where two or more averaged data variables are outputted, a single confidence value is outputted for each averaged data variable, respectively, at the end of the snapshot time interval.

Advantageously, the use of snapshot mode may allow the user to view only the data values that are measured when drive gain is below the drive gain threshold, and thus is more accurate. Accordingly, the use of snapshot mode may reduce the amount of data values that are output, may allow the operator to visualize more long term trends in the data values, and may filter out variability and inaccuracy in the flow data values that is created by multiphase conditions.

Figure 5:
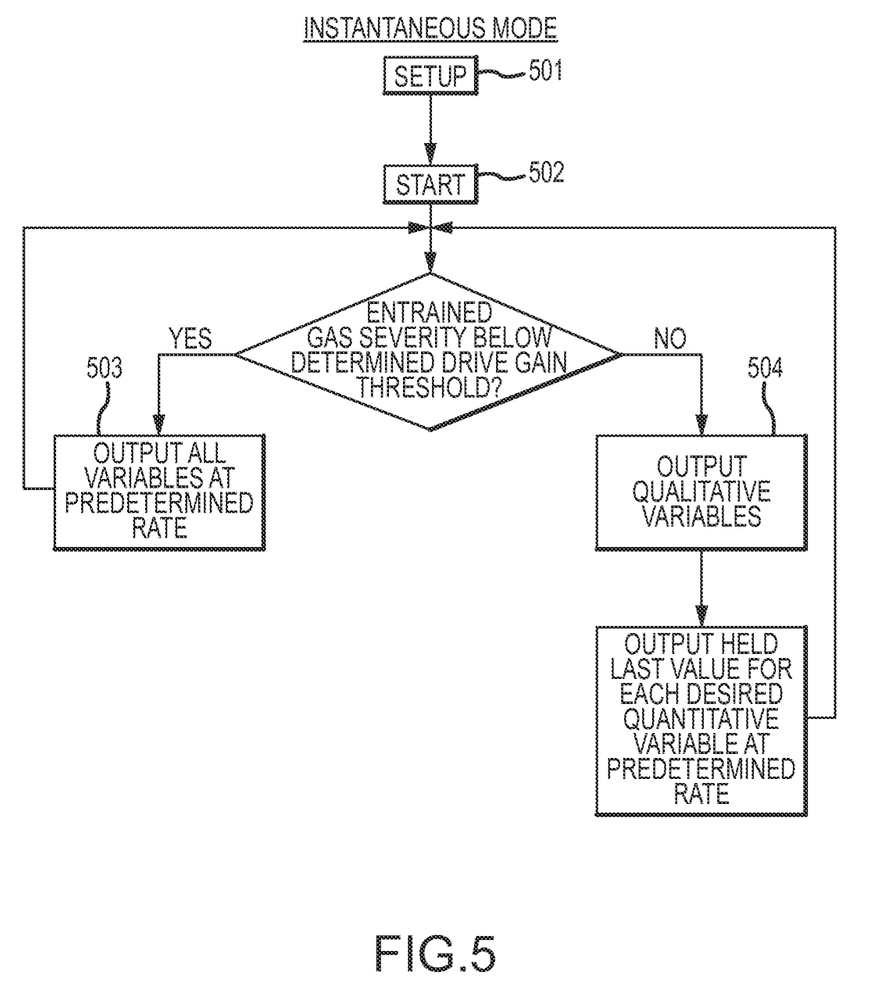
FIG. 5 is a flowchart of a method of the wellhead measurement device according to an embodiment of the invention.

FIG. 5 shows a flowchart of a method of the wellhead measurement device according to a second output mode of example embodiments. For convenience, the second output mode may be referred to as "instantaneous" mode throughout the description. According to FIG. 5, a wellhead measurement device is incorporated on an individual wellhead of a field of wellheads. In 501, as part of the setup, the measurement device includes customizable settings and configurations for the benefit of the operator of the device. For example, configurations and settings may be determined by a well site survey or well test, the geographic location, the well type (e.g. free-flowing or assisted lift), the flow rate, the density, and the behavior of the entrained gas in the measured fluid. Accordingly, an operator may determine proper setup of the measurement device, including what outputs are appropriate for the particular well site. For example, according to instantaneous mode, proper setup may include, but are not limited to: an output uniform rate for instantaneous mode (as discussed below) for well performance measurement, a determined drive gain threshold (as previously explained), threshold levels for the detection of the nature and severity of multiphase conditions, the particular output variables required by the operator, and the specific measurement data values (if any) that are to be held during instantaneous mode and output at a predetermined rate.

Upon commencement of various configurations and settings, the measurement device is ready for operation (502). Similar to snapshot mode, in the instantaneous mode, the quantity of the data output may be determined by the measurement device or may be set by the user. However, in contrast to the snapshot mode, for example, each data value is an instantaneous reading of the measurement device. Accordingly, in embodiments, the output quantity in instantaneous mode may be far greater than in snapshot mode. In the instantaneous mode, when entrained gas severity is below a determined drive gain threshold, all variables are output at a predetermined rate (503). If multiphase conditions exist within the flow, Transient Bubble Remediation (TBR) may be used concurrently with the measurement device and may be enabled automatically by the measurement device or can be manually initiated by the operator. However, if a well has a high gas fraction with continuous entrainment, TBR does not work well for the needs of the operator. In this scenario of continuous gas entrainment, the instantaneous mode will no longer output quantitative flow variables. In 504, when entrained gas severity is above a determined drive gain threshold, the instantaneous mode outputs variables that do not require accuracy or are not materially distorted by the presence of entrained gas (also referred to as qualitative variables), including, but not limited to: user alerts and diagnostic information including confidence indicators. Moreover, for example in this instance, with respect to flow variables that require accuracy in measurement, the instantaneous mode may holds the last value of the desired flow variables and outputs these values at a predetermined and uniform time interval.

In contrast to holding the last value of desired flow variables (as explained herein), TBR is utilized to hold last value of density when drive gain is elevated, for purposes of outputting a volume flow rate of the liquid portion of a flow stream (and rejecting the volume flow of gas). During the TBR routine, the mass flow is allowed to fluctuate. In TBR, the intention is for mass flow to continue to read accurately (for example, to decreases proportionally to the amount of gas), while the density value is held at the liquid-only value. Thus, when dividing mass by density, the volume flow rate output is the liquid-only volume flow rate. The problem with this is that decoupling causes an under-reporting of mass flow which can be quite large and is difficult to predict. Consider an example of a sudden introduction of 10% gas volume fraction to a water flow at 100 lb/min. The density would normally drop from 1 g/cc to about 0.9 g/cc due to the introduction of gas, but due to TBR, the density instead is held constant at 1 g/cc. The mass flow should drop from 100 lb/min to about 90 lb/min (due to the negligible mass of the gas). However, decoupling might cause the mass flow to instead drop to 75 lb/min, which then causes a large under-prediction of liquid volume flow rate during the passage of the gas slug.

$$\dot{Q}_{liquid} = \frac{\dot{m}_{mixture}}{\rho_{liquid}}$$

Here, $m_{mixture}$ is the measured mass flow rate during the gas slug and $\rho_{liquid}$ is the "held" value of density from before the gas slug. The true mixture mass flow is essentially equal to the liquid mass flow due to the negligible mass of the gas.

In example embodiments of the present invention, an assumption may be made which improves over known implementations of TBR. The assumption states that the total volume flow rate of the mixture of liquid and gas is constant during the time duration of the passage of an occasional slug of gas through the measurement device. This assumption may be made for direct wellhead measurement because the total pressure loss (or head loss) of the entire piping system is not significantly affected by the passage of occasional slugs of gas. Head loss in a piping system is affected by many things including viscosity, but is most dramatically affected by velocity, because velocity is the squared term in the head loss equation for pipe flow (see Darcy-Weisbach equation). If head loss remains constant, which is expected over the relatively short duration of the passage of a gas slug through the meter, it follows that velocity may remain relatively constant during the same time duration, and therefore, volume flow rate, also, may remain relatively constant.

Accordingly, assuming a constant total volume flow rate, we may use the measured value of density during the passage of a slug of gas (for example, the mixture density), along with the known liquid-only density, found during time durations of low drive gain (where entrained gas severity is detected to be below the predetermined drive gain threshold), to determine the phase fraction of liquid. This liquid phase fraction may be multiplied by the total volume flow rate (which is being held constant) to give a liquid volume flow rate, which is the desired quantity. A major distinction between this approach of the present invention and TBR, is that in aspects of the present invention we make use of the density measurement, instead of the mass flow measurement, during the slug of gas to determine liquid flow quantities. Like mass flow, density may also be affected by decoupling, and is somewhat in error during the gas slug. However, the density error may be much less severe, and much more predictable, resulting in a significant improvement in the overall liquid-only flow rate during passage of slugs. This described aspect of the present invention may only be feasible due to the assumption of constant volume flow, which is specific to wellhead measurement involving long pipe networks and relatively stable flow rates, at least on the timescale of a passage of a slug of gas through the meter.

$$\varphi_{liquid} = \frac{\rho_{mix} - \rho_{gas}}{\rho_{liquid} - \rho_{gas}}$$

$$\dot{Q}_{liquid} = \varphi_{liquid}\dot{Q}_{mixture}$$

Here, $\varphi_{liquid}$ is the phase fraction of liquid, $\rho_{liquid}$ is the "held" value of density, $\rho_{mixture}$ is the measured value of density during the gas slug, and $\rho_{gas}$ can be estimated according to pressure or assumed equal to zero. While ID mixture is in error due to decoupling, the magnitude of the error is much less than the error in $m_{mixture}$, the measured value of mixture mass flow used in the standard TBR algorithm. The decoupling effect on density is also much more predictable, and can be partially compensated for by assuming a constant decoupling ratio.

Accordingly, for example, in embodiments of the instantaneous mode, the measurement device may monitor flow in any flow condition, whether multiphase or single phase to generate diagnostic information and user alerts related to the outputted measurement variables. By way of example, and not limitation, while the above discussed features related to holding the last value of desired flow variables have been described in relation to the instantaneous mode, in other embodiments of the present inventions, these features may be implemented in the snapshot mode.

In operation, the use of instantaneous mode allows the operator to view short term trends of the well, but in some embodiments, the mode may not give accurate results within a desired time duration when multiphase conditions are severe or persistent. In these instances, for example, the operator may be provided alerts and warnings related to the quantitative and qualitative variables and respective confidence level indicators.

In aspects of the instantaneous mode, the factors in determining the confidence level indicator include, but are not limited to: a cumulative moving average of the percentage of time the entrained gas severity is above the determined drive gain threshold, the percentage of mass that flows through the measurement device when the entrained gas severity is above the determined drive gain threshold, and a measure of the quantity of durations where the entrained gas severity is below the determined drive gain threshold.

In other embodiments of the present invention, the confidence indicator can be based on the amount of time during a given time interval during which gas entrainment is detected. Alternatively, the confidence indicator may be calculated based on the portion of mass or volume flow which occurs with entrained gas compared to the total mass or volume flow during a given measurement time interval. Alternatively, the confidence level indicator may be based on a calculation of the flow variability. Alternatively, the confidence level indicator may be based on a weighted combination of the above methods. The confidence indicator may be represented through a display, error bars, alarms, and/or any known scale to illustrate relative confidence in the measurement.

In example embodiments, the confidence indicator may be configured to be periodically measured and outputted to help the operator interpret relative changes to the measurement variables of the well. For example, if the measurement device determines severe continuous entrained gas, and thus the confidence in measurements is low, a small relative change in the flow rate of the well may be safely ignored until higher confidence measurements are obtained. If, however, entrained gas is mild or intermittent, with corresponding high confidence in measurements, an operator may interpret a change in the measured flow rate of the well as a real change in production rate. The relative changes and confidence values may be determined for hourly, daily, and weekly increments. In instances where a greater relative change is determined, the operator may determine whether a more accurate test is necessary.

In an aspect of embodiments, an alert to the operator may be provided if the water cut flow variable has exceeded predetermined thresholds. For example, if the water cut flow variable is measured to be greater than 99%, then a well is no longer producing enough oil to justify continued service, and an alert is provided to notify the operator.

In an aspect of embodiments, the measurement device may include a historical graph showing the measurement values of flow variables and corresponding timestamps to indicate relative changes in the well output over time.

In an aspect of embodiments, a statistical analysis of measurement variables along with confidence level indicators with regard to those measurements, respectively, is provided. The analysis of measurement variables and confidence level indicators would aid the operator in the prevention of false alarms.

In an aspect of embodiments, the measurement time intervals may vary from hourly, daily, and weekly; and also may be customizable to the needs of the operator.

In an aspect of embodiments, an alert or alarm to the operator may be provided if flow variables of a well have changed dramatically due to changing flow conditions based on entrained gas severity exceeding a predetermined drive gain threshold.

In one aspect, an alarm is provided to recommend that the well be analyzed with a test separator due to a detected major change in flow variables including: flow rate, water cut, or other measured or calculated variables.

In other aspects, a totalized quantity of oil and water is given on a periodic basis if enough high confidence flow rate values are recorded during a predetermined time duration. Moreover, a rough indication of total mixture flow rate including an estimate of confidence in the measurement may be provided.

In embodiments, electric submersible pumps (ESPs) may be required in wells to actively pump liquids to the surface. The pumps may be installed down-hole, and historically have been difficult to control efficiently due to the lack of flow rate information. Pumps such as ESPs are designed to be operated most efficiently at specific flow rates. Flow rate measurements taken directly at the wellhead, as provided by embodiments of the present invention, allow the operation of the pumps at optimal efficiency, reducing electricity costs and preventing damage to the pumps.

Further, if a water cut probe, sonar-based gas volume fraction meter, or second wellhead measurement device is used in combination with an example embodiment, an approximate indication of water cut, gas volume fraction, and oil and water flow rates may be provided, along with confidence indicators, even when gas is present. In such instances, historical graphs and alerts based on these measurements may be provided. Also, various diagnostics indicating length of time for when multiphase conditions existed as opposed to single phase conditions may also be provided.

Advantageously, in an embodiment of the present invention, a single direct wellhead measurement meter may be configured on each well or a series of wells. Advantageously, the inventive aspects of the present invention provide much more information than a once-a-month well test, and costs far less than known multiphase measurements means known in the art.

Those of ordinary skill in the art will appreciate that the direct wellhead measurement device may operate continuously or operate only at various times based on a specified drive gain threshold or conditions of flow materials. By way of example, and not limitation, it is within the scope of the present invention to allow the operator to select which mode of wellhead measurement is optimal. By way of another example, and not limitation, the measurement device may be preprogrammed. By way of yet another example, different measurement diagnostics and indicators may be required for different types of measurement configurations.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A method for direct wellhead measurement of at least one well using a Coriolis flowmeter assembly including a driver and at least one pickoff sensor, the method comprising:
   determining an entrained gas severity of the at least one well, where the entrained gas severity is based on a measured drive gain exceeding a determined drive gain threshold, the drive gain being determined using the driver and the at least one pickoff sensor; and
   outputting at least one variable determined using the Coriolis flowmeter assembly based on the determined entrained gas severity,
   wherein determining the drive gain threshold comprises:
      computing at least one time interval where the measured drive gain is low and steady; and
      setting the drive gain threshold based on the measured drive gain correlating to the at least one time interval.

2. The method of claim 1, wherein the at least one variable includes at least one of: flow variables, diagnostic information, and user alerts.

3. The method of claim 2, wherein flow variables include at least one of: mass flow, volume flow, density, water cut, and net oil.

4. The method of claim 2, wherein the diagnostic information include at least one of: temperature; detection of multiphase conditions; time durations within measurement time intervals where the entrained gas is above the determined drive gain threshold; and information of multiphase conditions, the information of multiphase conditions including at least one of: gas void fraction, continuous entrainment, and slugging gas entrainment.

5. The method of claim 1, wherein the outputting the at least one variable includes continually averaging the at least one variable over a predetermined time interval and outputting a respective single averaged data value of the at least one variable.

6. The method of claim 5, wherein the predetermined time interval is determined by one of a user and flow conditions, the flow conditions including one of intermittent slugging and continuous entrainment.

7. The method of claim 5, wherein the predetermined time interval is one of uniform and non-uniform in duration.

8. The method of claim 5, wherein the at least one continually averaged variable includes at least one of: flow variables, diagnostic information, and user alerts if the entrained gas severity is below the determined drive gain threshold.

9. The method of claim 5, wherein the at least one continually averaged variable includes at least one of: diagnostic information and user alerts if the entrained gas severity is above the determined drive gain threshold.

10. The method of claim 1, wherein the outputting the at least one variable includes outputting at least one instantaneous variable at predetermined and uniform time intervals.

11. The method of claim 10, wherein the outputting the at least one instantaneous variable includes at least one of: flow variables, diagnostic information, and user alerts if the entrained gas severity is below the determined drive gain threshold.

12. The method of claim 10, wherein the outputting the at least one instantaneous variable include at least one of: diagnostic information and user alerts if the entrained gas severity is above the determined drive gain threshold.

13. The method of claim 12, wherein the outputting the at least one instantaneous variable further includes holding a last data value of flow variables and outputting the held last data value correlating to the predetermined and uniform time intervals.

14. The method of claim 1, further comprising:
   outputting a respective confidence indicator correlating to the at least one variable, wherein the respective confidence indicator is based on a time duration within a measurement time interval where gas entrainment is detected.

15. The method of claim 5, further comprising:
   outputting a respective confidence indicator correlating to the at least one variable wherein the respective confidence indicator is based on at least one of: a percentage of mass during the predetermined time interval where the entrained gas severity is above the determined drive gain threshold, a percentage of time where the entrained gas severity is above the determined drive gain threshold, and total volume flow.

16. The method of claim 10, further comprising:
   outputting a respective confidence indicator correlating to the at least one variable wherein the respective confidence indicator is based on at least one of: a cumulative moving average of a percentage of time the entrained gas severity is above the determined drive gain threshold, a percentage of mass flow where the entrained gas severity is above the determined drive gain threshold, a quantity of time durations where entrained gas severity is below the determined drive gain threshold, and total volume flow.

17. The method of claim 1, wherein the at least one well includes electric submersible pumps.

18. The method of claim 1, wherein determining the drive gain threshold includes determining if flow conditions include at least one of: gas void fraction, continuous entrainment, and slugging gas entrainment.

19. The method of claim 1, wherein determining the drive gain threshold includes:
   storing at least one factory baseline drive gain values set during meter calibration.

20. The method of claim 1, including:
   correcting the drive gain threshold based on a measured water cut and increases in viscosity.

21. The method of claim 1, further comprising outputting a respective confidence indicator correlating to the at least one variable.

22. The method of claim 21, wherein the respective confidence indicator is based on a computed comparison of a portion of one of mass or volume flow occurring with gas entrainment and one of a total mass and total volume flow during a measurement time interval.

23. The method of claim 21, wherein the respective confidence indicator is based on a computation of flow conditions, the flow conditions including one of intermittent slugging and continuous entrainment.

24. Meter electronics (20) for a direct wellhead measurement device (5), the meter electronics (20) comprising an interface (201) configured to communicate with a Coriolis flowmeter assembly of the direct wellhead measurement device (5), the Coriolis flowmeter assembly comprising a driver and at least one pickoff sensor, and receive a vibrational response, and a processing system (203) coupled to the interface (201) and configured to:
   determine an entrained gas severity of an at least one well, where the entrained gas severity is based on a measured drive gain exceeding a determined drive gain threshold, the measured drive gain being determined using the driver and the at least one pickoff sensor; and output the least one variable determine using the Coriolis flowmeter assembly based on the determined entrained gas severity, wherein determining the drive gain threshold comprises:
computing at least one time travel interval where the measured drive gain is low and steady; and
setting the drive gain threshold based on the measured drive gain correlating to the at least one time interval.

25. A Coriolis direct wellhead measurement device (5) comprising:
a Coriolis flowmeter assembly (10) to generate a vibrational response; and
meter electronics (20) connected to the flowmeter assembly configured to receive and process the vibrational response to generate at least one variable; the meter electronics further configured to:
determine an entrained gas severity of an at least one well, where the entrained gas severity is based on a measured drive gain exceeding a determined drive gain threshold, the measured drive gain being determined using a driver of the Coriolis flowmeter assembly and the at least one pickoff sensor; and output the least on variable determined using the Coriolis flow meter based on the determined entrained gas severity, wherein determining the drive gain threshold comprises:
computing at least one time interval where the measured drive gain is low and steady; and
setting the drive gain threshold based on the measured drive gain correlating to the at least one time interval.

26. The meter electronics (20) of claim 24, wherein the processing system (203) is further configured to output a respective confidence indicator correlating to the at least one variable.

27. The Coriolis direct wellhead measurement device (5) of claim 25, wherein the meter electronics (20) is further configured to output a respective confidence indicator correlating to the at least one variable.

* * * * *